April 10, 1951 G. D. PERKINS ET AL 2,548,813

RADIO TRANSMITTING-RECEIVING APPARATUS

Filed Oct. 19, 1945

INVENTORS
GEORGE D. PERKINS
BY CHARLES E. STONE JR.

William D. Hall

ATTORNEY

Patented Apr. 10, 1951 2,548,813

UNITED STATES PATENT OFFICE 2,548,813

RADIO TRANSMITTING-RECEIVING APPARATUS

George D. Perkins, Allston, and Charles E. Stone, Jr., Littleton, Mass., assignors, by mesne assignments, to the United States of America as represented by the Secretary of War Application October 19, 1945, Serial No. 623,399

7 Claims. (Cl. 250—17)

This invention relates in general to radio communication systems and more particularly to receiver-transmitters for such apparatus.

The art of radio communication includes, as well as circuits which have become conventional through extensive use in the past, other circuits which are of comparatively recent development. Among these new circuits are those which are adapted to the reception and automatic retransmission of pulsed radio signals for radio beacon navigation. The present invention has found use in the navigation of aircraft although it is by no means limited to such an application.

Accordingly, it is one object of the present invention to provide apparatus for the reception and automatic retransmission of radio signals.

Another object is to provide apparatus responsive to pulsed signals in a predetermined code.

Still another object is to provide a receiver-transmitter for radio beacon navigational purposes.

Briefly, the invention disclosed and described in the following specification comprises a pulse communication system including a coincidence triggered, self-extinguishing, regenerative receiver. This receiver circuit is designed to be sensitized by an incoming signal of a first frequency and then triggered by a second incoming signal at another frequency, the output of the receiver being used to control the operation of a modulator and transmitter.

Figure 1:
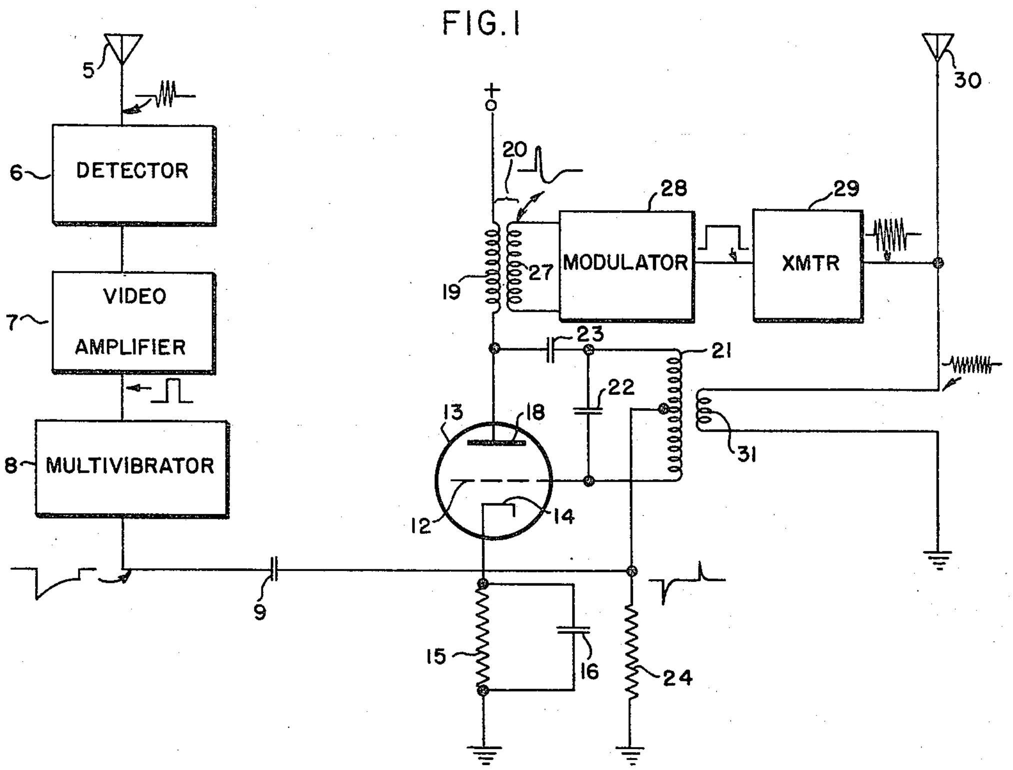

The invention will best be understood upon reference to the following specification, claims, and to the drawings in which:

Fig. 1 sets forth a partially schematic diagram of the invention; and

Figure 2:
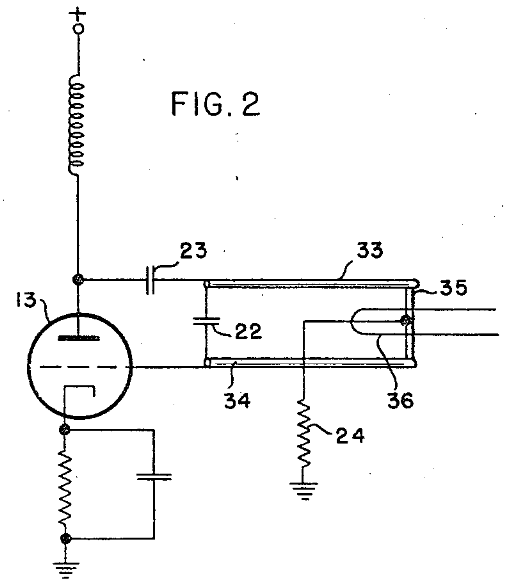

Fig. 2 shows a diagram of a portion of the circuit of Fig. 1 in an alternative embodiment.

Referring now to Fig. 1, antenna 5 is connected to detector circuit 6 which in turn is connected to video amplifier 7. The output of amplifier 7 is fed to multivibrator 8, the signal generated by the latter circuit being impressed across the series combination of capacitor 9 and resistor 24.

Cathode 14 of vacuum tube 13 is connected through resistor 15 to ground, the resistor being by-passed by capacitor 16. Anode 18 is connected through primary winding 19 of transformer 20 to a suitable source of positive potential. A tank circuit consisting of inductor 21 and capacitor 22 is connected between grid 12 and anode 18, blocking capacitor 23 being inserted between the tank circuit and anode 18 in order to prevent the existence of high direct voltages in the tank circuit.

The midpoint of inductor 21 is connected to ground through resistor 24.

Secondary winding 27 of transformer 20 is connected to modulator 28 which controls the operation of transmitter 29. The output of transmitter 29 is fed to antenna 30 which also functions as a receiving antenna, being connected to ground through coupling coil 31 which is associated with inductor 21. Those circuits indicated by labeled blocks are standard in the art and hence are not shown in detail.

In operation, antenna 5 receives a signal from an external pulse transmitter, the frequency of this signal being hereafter termed for purposes of brevity, frequency A. Detector 6 demodulates the signal and the resulting pulse envelope is amplified as desired in video amplifier 7. Multivibrator 8, upon being triggered by the output of amplifier 7, generates a negative-going pulse of controllable duration. This pulse is differentiated by capacitor 9 and resistor 24, shorter negative and positive pulses being formed from the leading and trailing edges, respectively, of the multivibrator output. These pulses appear at grid 12 of tube 13.

Cathode resistor 15 of tube 13 is of high value, being in one embodiment approximately 20,000 ohms, hence the circuit is highly degenerative for signals of relatively low frequency. In its quiescent state tube 13 is therefore self-biased almost to cut off potential. The sudden arrival of a positive voltage pulse on grid 12 overcomes the heavy bias temporarily and places the tube in a sensitive condition from which it may break into oscillation. The receiver however remains quiescent unless the tank circuit is excited during the period of sensitivity by a signal received at antenna 30. The frequency of this second signal will hereafter be referred to as frequency B to distinguish it from that of the first signal. Although both signals emanate from the same external point, it is necessary that they be of different frequencies in order that the channel from antenna 5 to grid 12 will not be operated by the second signal. Selectivity is accomplished by constructing antenna 5 and detector 6 to be sensitive only to frequency A, and antenna 30 and the tuned circuit consisting of capacitor 22 and inductor 21 to be sensitive only to frequency B. It will be understood that the choice of frequencies used is virtually unlimited, the main condition being that frequencies A and B be sufficiently disparate to permit distinction between the two.

When signals of both frequencies have arrived in the proper time relationship, grid 12 is sensitized and simultaneously the tank circuit is excited causing tube 13 to oscillate at frequency B. Oscillations build up rapidly by reason of the regenerative nature of the circuit. Current flow is heavy in the tube charging capacitor 16 which can discharge only slowly through resistor 15. The saturation point of the tube at which the current no longer increases is quickly reached. The sudden cessation of increase in current flow through tube 13 causes a voltage to be set up across primary winding 19 in the plate circuit which subtracts from the positive plate supply voltage, lowering the voltage on anode 18 substantially. This decreased plate voltage in conjunction with the high ctahode potential resulting from the charging of capacitor 16 is sufficient to cause the tube to cease conduction, thereby halting further oscillation therein.

The envelope of the oscillations appears across secondary winding 27 of transformer 20 which may have a step up ratio of the order of 1:2. This voltage pulse triggers modulator circuit 28 which generates a rectangular pulse by which transmitter 29 is turned on, emitting a burst oscillation at frequency B from antenna 30. Although some of this energy is fed into the tank circuit by coil 31, tube 13 will not oscillate because grid 12 is insensitive.

In practice the frequencies employed are often high enough to allow use of a tank circuit as shown in Fig. 2 in which the inductive element is formed by two parallel wires 33 and 34, short circuited at one end by a conductor 35. A coupling loop 36 placed between wires 33 and 34 performs the function of coil 31 in Fig. 1. The length of wires 33 and 34 is adjusted so that at frequency B, they are resonant and slightly less than a quarter wavelength long.

While there has been described hereinabove what is at present considered to be a preferred embodiment of the present invention, it will be obvious to those skilled in the art that changes and modifications may be made therein without exercise of inventive ingenuity.

What is claimed is:

1. In a transmitting-receiving apparatus wherein said apparatus responds to signals generated externally to said apparatus and wherein said signals are spaced apart as to the time of initiation thereof, means for receiving said signals, a normally inoperative oscillator, means for impressing one of said received signals onto said oscillator to bring said oscillator in a state bordering on oscillation and means to initiate oscillation in said oscillator under the control of the other of said received signals.

2. Apparatus in accordance with claim 1 wherein said oscillator includes a thermionic electron discharge device having a cathode electrode and a plate electrode, a circuit interconnecting said cathode and plate electrodes, a resistor which offers substantial impedance to the flow of electric current therethrough, a capacitor, and means for connecting said resistor and said capacitor in parallel in the cathode-plate circuit of said thermionic discharge device.

3. In a transmitting-receiving circuit adapted to respond only to a pair of signals which are generated externally to said circuit and have predetermined different frequencies and are spaced apart as to the time of initiation thereof by a predetermined amount, the arrangement comprising a normally inoperative oscillator circuit, means tuned to the frequency of one of said signals for deriving a direct current pulse from said one signal and for applying said pulse to said oscillator circuit to render said oscillator circuit capable of oscillating, means including a filter circuit connected in said oscillator circuit for preventing the initiation of oscillations by said direct curernt pulse, and means tuned to the frequency of the other of said signals for applying said other signal to said oscillator circuit simultaneously with said pulse to initiate oscillations.

4. In a transmitting-receiving apparatus adapted to respond only to a pair of signals which are generated externally to said apparatus and have predetermined different frequencies and are spaced apart as to the time of initiation thereof by a predetermined amount, the arrangement comprising a normally inoperative oscillator circuit, means tuned to the frequency of one of said signals for deriving a direct current pulse from said one signal and for applying said pulse to said oscillator circuit to render said oscillator circuit capable of oscillating, means including a resistance and a condenser connected in parallel in said oscillator circuit for preventing the initiation of oscillations by said direct current pulse, and means tuned to the frequency of the other of said signals for applying said other signal to said oscillator circuit simultaneously with said pulse to initiate oscillations.

5. In a transmitting-receiving apparatus adapted to respond only to a pair of signals which are generated externally to said apparatus and have predetermined different frequencies and are spaced apart as to the time of intiation thereof by a predetermined amount, the arrangement comprising an electron tube having a cathode and at least one grid and a plate, means coupled to said tube for supplying regenerative feedback, means including a resistance and a condenser connected in parallel between said cathode and plate for biasing said tube nearly to cut-off, means tuned to the frequency of one of said signals for deriving a direct current pulse from said one signal and for applying said pulse to said tube to render said tube capable of oscillating, said resistance and condenser preventing the initiation of oscillations by said direct current pulse, and means tuned to the frequency of the other of said signals for applying said other signal to said tube simultaneously with said pulse to initiate oscillations.

6. A transmitting-receiving apparatus adapted to respond to a pair of signals which are generated externally to said apparatus and have different frequencies and are spaced apart as to the time of initiation thereof, comprising means tuned to the frequency of one of said signals for receiving said one signal, means for deriving a direct current pulse from said one signal delayed in time with respect to the time of arrival of said one signal, an electron tube having a cathode and at least one grid and a plate, regenerative feedback means coupled between said grid and plate, biasing means including a resistance and condenser connected in parallel between said cathode and plate for biasing said tube substantially to cut-off, means for applying said direct current pulse to said grid to overcome the bias of said tube, means tuned to the frequency of the other of said signals for receiving said other signal, said other signal being spaced in time from said one signal by an amount comparable to the delay of said direct current pulse behind said one signal, means coupling said last-mentioned receiving means to said regenerative feedback means for causing said tube to oscillate, an inductance coupled in the plate-cathode circuit of said tube for quenching the oscillations of said tube, transmitting means, and means coupling the output of said tube to said transmitting means for rendering said transmitting means operative.

7. A coincidence-triggerable translating device for use in a transmitting-receiving circuit which responds only to a pair of signals generated externally to said circuit and having predetermined different frequencies and being spaced apart as to the time of initiation thereof by a predetermined amount, the device comprising normally inoperative oscillator means, means tuned to the frequency of one of said signals and coupled to said oscillator means for impressing said one signal on said oscillator means to render said oscillator means capable of oscillating, and means tuned to the frequency of the other of said signals and coupled to said oscillator means to initiate oscillations.

GEORGE D. PERKINS.
CHARLES E. STONE, JR.

REFERENCES CITED

The following references are of record in the file of this patent:

UNITED STATES PATENTS

| Number | Name | Date |
|---|---|---|
| 2,262,838 | Deloraine et al. | Nov. 18, 1941 |
| 2,292,222 | Haigis | Aug. 4, 1942 |
| 2,333,688 | Shepard, Jr. | Nov. 9, 1943 |